and a single transmission usage between the network device for
which the transmission has not been determined to fail.

US011329710B2

(12) United States Patent
Akoum et al.

(10) Patent No.: US 11,329,710 B2
(45) Date of Patent: May 10, 2022

(54) FACILITATION OF BEAM FAILURE INDICATION FOR MULTIPLE TRANSMISSION POINTS FOR 5G OR OTHER NEXT GENERATION NETWORK

(71) Applicant: AT&T Intellectual Property I, L.P., Atlanta, GA (US)

(72) Inventors: Salam Akoum, Austin, TX (US); Xiaoyi Wang, Austin, TX (US); Arunabha Ghosh, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 176 days.

(21) Appl. No.: 16/796,410

(22) Filed: Feb. 20, 2020

(65) Prior Publication Data

US 2021/0143889 A1    May 13, 2021

Related U.S. Application Data

(60) Provisional application No. 62/932,694, filed on Nov. 8, 2019.

(51) Int. Cl.
*H04B 7/06*        (2006.01)
*H04B 7/0417*     (2017.01)
(Continued)

(52) U.S. Cl.
CPC ......... *H04B 7/0695* (2013.01); *H04B 7/0417* (2013.01); *H04W 16/28* (2013.01); *H04W 72/042* (2013.01)

(58) Field of Classification Search
CPC .... H04B 7/0695; H04B 7/0417; H04B 7/024; H04B 7/088; H04B 7/0654;
(Continued)

(56) References Cited

U.S. PATENT DOCUMENTS 8,570,963 B2    10/2013    Barany et al.
8,917,614 B2    12/2014    Luo et al.
(Continued)

FOREIGN PATENT DOCUMENTS

WO    2009/137092 A1    11/2009
WO    2016/208991 A1    12/2016
(Continued)

OTHER PUBLICATIONS

Notice of Allowance received for U.S. Appl. No. 15/705,946 dated Nov. 27, 2018, 42 pages.
(Continued)

*Primary Examiner* — Kiet Tang
(74) *Attorney, Agent, or Firm* — Amin, Turocy & Watson, LLP

(57) ABSTRACT

For the case of multi-transmission point transmissions (TRPs), when a transmission on one of the TRPs fail, the network can receive date from a mobile device such that the network knows immediately that the transmission failed on a network node. After received the failed transmission data, the network can facilitate the mobile device switching from a dual transmission usage between two network devices to a single transmission usage between the network device for which the transmission has not been determined to fail.

20 Claims, 10 Drawing Sheets

(51) Int. Cl.
*H04W 72/04* (2009.01)
*H04W 16/28* (2009.01)

(58) Field of Classification Search
CPC ... H04W 72/042; H04W 16/28; H04W 76/19; H04W 76/15; H04W 72/0466; H04W 74/0833; H04L 5/0091; H04L 5/006; H04L 5/0048; H04L 5/0085; H04L 5/0053; H04L 5/0032; H04L 5/0023
See application file for complete search history.

(56) References Cited

U.S. PATENT DOCUMENTS

| | | | |
|---|---|---|---|
| 9,237,475 | B2 | 1/2016 | Josiam et al. |
| 9,408,220 | B2 | 8/2016 | Gore et al. |
| 9,456,359 | B2 | 9/2016 | Kim et al. |
| 9,526,089 | B2 | 12/2016 | Jang et al. |
| 9,537,554 | B2 | 1/2017 | Ding et al. |
| 9,602,177 | B2 | 3/2017 | Ko et al. |
| 2008/0212615 | A1 | 9/2008 | Ranta-Aho et al. |
| 2011/0110251 | A1* | 5/2011 | Krishnamurthy ... H04W 72/082 370/252 |
| 2011/0110453 | A1 | 5/2011 | Prasad et al. |
| 2014/0003240 | A1 | 1/2014 | Chen et al. |
| 2014/0073337 | A1 | 3/2014 | Hong et al. |
| 2015/0257073 | A1 | 9/2015 | Park et al. |
| 2016/0105872 | A1 | 4/2016 | Kuo |
| 2016/0226642 | A1 | 8/2016 | Aiba et al. |
| 2017/0005764 | A1 | 1/2017 | Park et al. |
| 2017/0012724 | A1 | 1/2017 | Zirwas |
| 2017/0070277 | A1 | 3/2017 | Si et al. |
| 2017/0094531 | A1 | 3/2017 | Kakishima et al. |
| 2017/0195020 | A1 | 7/2017 | Ko et al. |
| 2017/0207843 | A1 | 7/2017 | Jung et al. |
| 2018/0227899 | A1 | 8/2018 | Yu et al. |
| 2018/0279286 | A1 | 9/2018 | Akoum et al. |
| 2020/0077283 | A1* | 3/2020 | Zhou ............ H04B 7/088 |
| 2021/0044342 | A1* | 2/2021 | He ............ H04W 74/0833 |
| 2021/0050901 | A1* | 2/2021 | Chin ............ H04W 72/14 |
| 2021/0126690 | A1* | 4/2021 | Matsumura ......... H04B 7/0654 |
| 2021/0306867 | A1* | 9/2021 | Hamidi-Sepehr ........... H04W 72/0466 |

FOREIGN PATENT DOCUMENTS

| | | |
|---|---|---|
| WO | 2017/003327 A1 | 1/2017 |
| WO | 2017/160052 A2 | 9/2017 |

OTHER PUBLICATIONS

Giordani et al., "An Efficient Uplink Multi-Connectivity Scheme for 5G mmWave Control Plane Applications", Jul. 21, 2017, pp. 1-32.

Tang et al., "Opportunistic Feedback for Multiuser MIMO Systems With Linear Receivers", IEEE Transactions on Communications, vol. 55, No. 5, 2007, pp. 1020-1032.

Wang et al., "A Unified Approach to QoS-Guaranteed Scheduling for Channel-Adaptive Wireless Networks", Proceedings of the IEEE, vol. 95, No. 12, Dec. 2007, pp. 2410-2431.

Non-Final Office Action received for U.S. Appl. No. 16/285,420 dated Mar. 21, 2019, 27 pages.

International Search Report and Written Opinion received for PCT Application Serial No. PCT/US2018/050113 dated Jan. 7, 2019, 11 pages.

AT&T., "Beam Failure Recovery Mechanism and RLF", http://www.3gpp.org/ftp/tsg_ran/WG2_RL2/TSGR2_AHs/2017_06_NR/Docs/, 3rd Generation Partnership Project (3gpp), Mobile Competence Centre.

AT&T., "Considerations on Beam Failure Recovery Mechanism", http://www.3gpp.org/ftp/Meetings_3GPP_SYNC/RAN1/Docs/, 3rd Generation Partnership Project (3gpp), Mobile Competence Centre.

Mediatek Inc., "Offline Discussion on Beam Recovery Mechanism", http://www.3gpp.org/ftp/tsg_ran/WG1_RL1/TSGR1_90/Docs/, 3rd Generation Partnership Project (3gpp), Mobile Competence Centre.

Giordani et al.,"Uplink-Based Framework for Control Plane Applications in 5G mmWave Cellular Networks", Oct. 16, 2016, pp. 1-31.

Non-Final Office Action received for U.S. Appl. No. 16/599,248 dated May 14, 2020, 53 pages.

International Preliminary Report on Patentability for International Application No. PCT/US2018/050113 dated Mar. 26, 2020, 9 pages.

* cited by examiner

FACILITATION OF BEAM FAILURE INDICATION FOR MULTIPLE TRANSMISSION POINTS FOR 5G OR OTHER NEXT GENERATION NETWORK

CROSS-REFERENCE TO RELATED APPLICATION

The subject patent application claims priority to U.S. Provisional Patent Application No. 62/932,694, filed Nov. 8, 2019, and entitled "FACILITATION OF BEAM FAILURE INDICATION FOR MULTIPLE TRANSMISSION POINTS FOR 5G OR OTHER NEXT GENERATION NETWORK." The entirety of the aforementioned application is hereby incorporated by reference herein.

TECHNICAL FIELD

This disclosure relates generally to facilitating multi-transmission point transmissions. For example, this disclosure relates to facilitating beam failure indications for multiple transmission points for a 5G, or other next generation network, air interface.

BACKGROUND

5th generation (5G) wireless systems represent a next major phase of mobile telecommunications standards beyond the current telecommunications standards of $4^{th}$ generation (4G). Rather than faster peak Internet connection speeds, 5G planning aims at higher capacity than current 4G, allowing a higher number of mobile broadband users per area unit, and allowing consumption of higher or unlimited data quantities. This would enable a large portion of the population to stream high-definition media many hours per day with their mobile devices, when out of reach of wireless fidelity hotspots. 5G research and development also aims at improved support of machine-to-machine communication, also known as the Internet of things, aiming at lower cost, lower battery consumption, and lower latency than 4G equipment.

The above-described background relating to beam failure indications for multiple transmission points is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
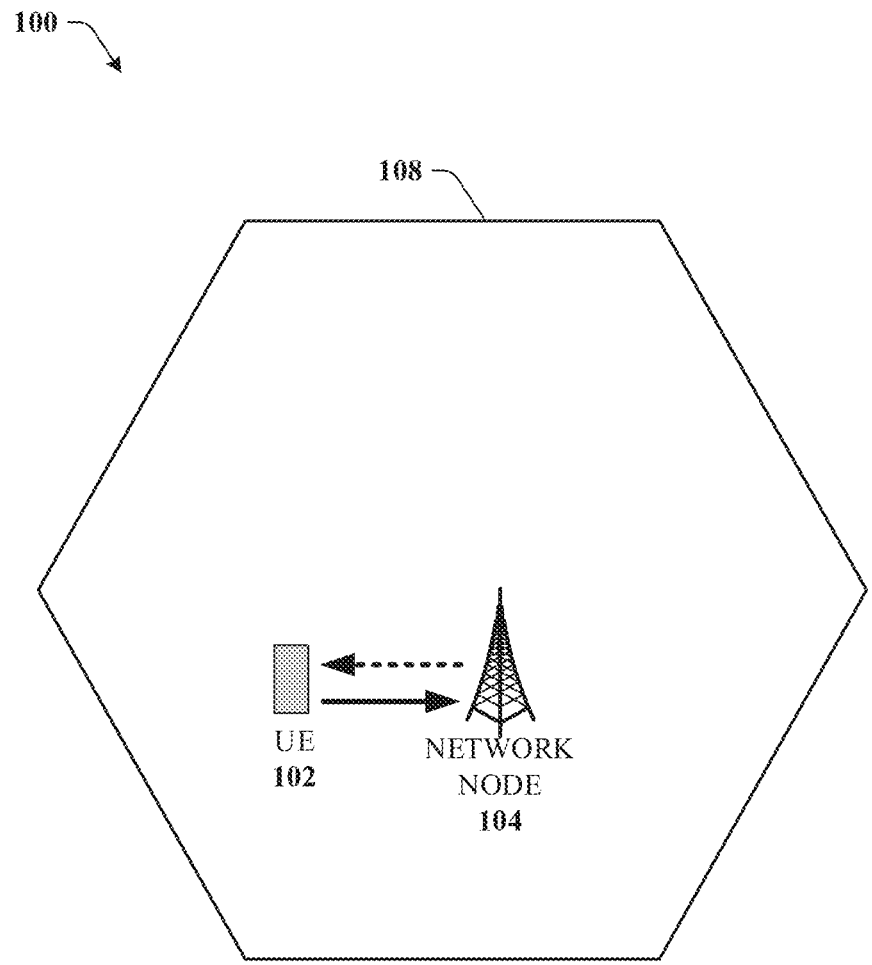
FIG. 1 illustrates an example wireless communication system in which a network node device (e.g., network node) and user equipment (UE) can implement various aspects and embodiments of the subject disclosure.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, or machine-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to facilitate beam failure indications for multiple transmission points for a 5G air interface or other next generation networks. For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, including a non-transitory machine-readable storage medium.

It should be noted that although various aspects and embodiments have been described herein in the context of 5G, Universal Mobile Telecommunications System (UMTS), and/or Long Term Evolution (UM), or other next generation networks, the disclosed aspects are not limited to 5G, a UMTS implementation, and/or an LTE implementation as the techniques can also be applied in 3G, 4G or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed. Downlink Packet Access (HSDPA), High-Speed Uplink Packet Access (HSUPA), Zigbee, or another IEEE 802.12 technology. Additionally, substantially all aspects disclosed herein can be exploited in legacy telecommunication technologies.

Described herein are systems, methods, articles of manufacture, and other embodiments or implementations that can facilitate beam failure indications for multiple transmission points for a 5G network. Facilitating beam failure indications for multiple transmission points for a 5G network can be implemented in connection with any type of device with a connection to the communications network (e.g., a mobile handset, a computer, a handheld device, etc.) any Internet of things (IOT) device (e.g., toaster, coffee maker, blinds, music players, speakers, etc.), and/or any connected vehicles (cars, airplanes, space rockets, and/or other at least partially automated vehicles (e.g., drones)). In some embodiments the non-limiting term user equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles etc. Note that the terms element, elements and antenna ports can be interchangeably used but carry the same meaning in this disclosure. The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception.

In some embodiments the non-limiting term radio network node or simply network node is used. It can refer to any type of network node that serves UE is connected to other network nodes or network elements or any radio node from where UE receives a signal. Examples of radio network nodes are Node B, base station (BS), multi-standard radio (MSR) node such as MSR BS, eNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS) etc.

Cloud radio access networks (RAN) can enable the implementation of concepts such as software-defined network (SDN) and network function virtualization (NFV) in 5G networks. This disclosure can facilitate a generic channel state information framework design for a 5G network. Certain embodiments of this disclosure can comprise an SDN controller that can control routing of traffic within the network and between the network and traffic destinations. The SDN controller can be merged with the 5G network architecture to enable service deliveries via open application programming interfaces ("APIs") and move the network core towards an all interne protocol ("IP"), cloud based, and software driven telecommunications network. The SDN controller can work with, or take the place of policy and charging rules function ("PCRF") network dements so that policies such as quality of service and traffic management and routing can be synchronized and managed end to end.

To meet the huge demand for data centric applications, 4G standards can be applied 5G, also called new radio (NR) access. 5G networks can comprise the following: data rates of several tens of megabits per second supported for tens of thousands of users; 1 gigabit per second can be offered simultaneously to tens of workers on the same office floor; several hundreds of thousands of simultaneous connections can be supported for massive sensor deployments; spectral efficiency can be enhanced compared to 4G; improved coverage; enhanced signaling efficiency; and reduced latency compared to LTE. In multicarrier system such as OFDM, each subcarrier can occupy bandwidth (e.g., subcarrier spacing). If the carriers use the same bandwidth spacing, then it can be considered a single numerology. However, if the carriers occupy different bandwidth and/or spacing, then it can be considered a multiple numerology.

Downlink reference signals are predefined signals occupying specific resource dements within a downlink time-frequency grid. There are several types of downlink reference signals that can be transmitted in different ways and used for different purposes by a receiving terminal. Channel state information reference signals (CSI-RS) can be used by terminals to acquire channel-state information (CSI) and beam specific information (e.g., beam reference signal received power). In 5G, CST-RS can be user equipment (UE) specific so it can have a significantly lower time/frequency density. Demodulation reference signals (DM-RS), also sometimes referred to as UE-specific reference signals, can be used by terminals for channel estimation of data channels. The label "UE-specific" relates to each demodulation reference signal being intended for channel estimation by a single terminal. The demodulation reference signal can then be transmitted within the resource blocks assigned for data traffic channel transmission to that terminal. Other than the aforementioned reference signals, there are other reference signals, namely multi-cast broadcast single frequency network (MBSFN) and positioning reference signals that can be used for various purposes.

One of the main hurdles for communication in mmWave is blockage effect. As a result of smaller wave lengths, objects around the user, including the user, can block the mmWave propagation in a certain direction temporarily. The narrower beamforming of NR also makes this effect more obvious. In NR, beam management and beam failure recovery procedures can be introduced to overcome the blockage effect.

Beam management is a procedure for the LTE to select the best beam for transmission and reception. Beam failure recovery is a procedure to overcome the blockage effect and provide robustness to the connection. Beam failure can be declared when the control resource sets (e.g., channels) fail. Multiple transmissions points (TRP) where different TRPs or panels are used for joint transmissions to a single UE provides multiple antenna communication in NR.

Because joint transmission in LTE is mostly coherent joint transmission, a certain level of time frequency synchronization between the TRPs can be required to make the joint transmission, and therefore does not scale well to higher numerology. In NR, a joint transmission can be a non-coherent joint transmission (NCJT), and does not require a tight time frequency synchronization. This can shift some of the complexity to the receiver, since the receiver can handle inter subcarrier and inter layer interference during channel estimation and demodulation. NCJT with multiple downlink control information (DCI) and NCJT with single DCI can both being considered. However, the former mostly caters to non-ideal backhaul, while the latter is for ideal backhaul and URLLC applications.

For the case of a multi-TRP transmission, when a transmission on one of the TRPs fail, it is beneficial for the network to know immediately that the transmission failed on one TRP, and then switch to a single TRP transmission. Thus, a partial beam failure recovery procedure can be used where failure on one TRP is indicated using the uplink control channel of the other non-failed TRP.

A UE can be configured to receive PDSCH from two different TRPs. Thus, in a multiple PDCCH scenario, the UE can receive two PDCCHs and two PDSCHs from two TRPs, respectively. The UE can be configured with a reference signal (RS) setting for each TRP. The RS setting can contain a configuration of resource sets comprising a number of CSI-RS resources. For example, the resource sets can comprise a synchronization signal (SS) and/or physical broadcast channel wherein the physical broadcast resources can be used for an L1-reference signal received power (RSRP) computation. The UE can report on a selected transmission beam from each TRP, used for PDCCH and PDSCH transmission. The UE can also be configured with a list of up to M transmission configuration indication (TCI) state configurations to decode each PDSCH according to the detected PDCCH. Each TCI state can comprise parameters for configuring a quasi-co-location (QCL) relationship between one or two downlink reference signals and the DMRS ports of the PDSCH. The UE can also receive an activation command to map up to 8 TCI states to the TCI codepoints in the DCI. Each of the TCI codepoints can indicate a QCL relation of a given PDSCH corresponding to one of the TRPs.

When all the serving control channels fail for one TRP, a partial beam failure can be declared for that TRP, wherein the beam failure can be determined based on a hypothetical PDCCH block error rate (BLER). The UE can monitor the beam failure detection RS to assess if the beam failure trigger failure condition has been met. Thus, the UE does not have to wait for all the CORESETs to fail on all the TRPs. Rather, the UE can declare the partial beam failure on only the CORESETs corresponding to a failing TRP. The UE can report the beam failure event on one TRP using a working beam corresponding to the CORESETS of the working TRP(s). Consequently, the UE can report the beam failure event on the failed TRP on the PUCCH carrying the acknowledgement (ACK)/negative acknowledgement (NACK) for the working TRP, the PUSCH carrying uplink control information (UCI) for the working TRP, and/or a dedicated radio access channel (RACH) to the working TRP.

The beam failure event reporting on the PUCCH carrying the ACK/NACK can be performed either by: 1) adding a bit to the ACK/NACK feedback on the working TRP to indicate the beam failure event on the failed TRP; or 2) adding a CSI feedback indicating the beam failure event on the failed TRP in a ACK/NACK+CST PUCCH format. The beam management RSRP and beam failure event of the failing TRP can be jointly reported on a control feedback channel corresponding to the working TRP. Thus, upon reception of the beam failure event, the network can switch to a single TRP transmission that is different than multi-TRP transmission, until the connection with the failed TRP can be re-established.

In one embodiment, described herein is a method comprising receiving, by a mobile device comprising a processor, first information representative of a first physical downlink shared channel and a first physical downlink control channel from a first base station device. The method can comprise receiving, by the mobile device, second information representative of a second physical downlink shared channel and a second physical downlink control channel from a second base station device, resulting in dual information comprising the first information and the second information. In response to a determination that the first physical downlink shared channel and the first physical downlink control channel have failed, indicative of a beam failure, the method can comprise reporting, by the mobile device, the beam failure of the first base station device to the second base station device. Additionally, in response to the reporting the beam failure, the method can comprise receiving, by the mobile device, single information, different than the dual information, comprising the second information from the second base station device.

According to another embodiment, a system can facilitate, configuring a mobile device to receive first data associated with a first physical downlink shared channel and a first physical downlink control channel from a first base station device. The system can comprise configuring the mobile device to receive second data associated with a second physical downlink shared channel and a second physical downlink control channel from a second base station device. In response to the first physical downlink control channel being determined to have failed, the system can comprise receiving beam failure data representative of a beam failure of the first base station device. Additionally, in response to the receiving the beam failure data, the system can comprise terminating the first data associated with the first physical downlink shared channel and the first physical downlink control channel from the first base station device.

According to yet another embodiment, described herein is a machine-readable storage medium that can perform the operations comprising facilitating configuring a mobile device to receive first physical downlink shared channel data and first physical downlink control channel data from a first base station device, and configuring the mobile device to receive second physical downlink shared channel data and second physical downlink control channel data from a second base station device. In response to a first physical downlink control channel transmission associated with the first physical downlink shared channel data being determined to have failed, the machine-readable storage medium can perform the operations comprising receiving beam failure data representative of a beam failure of the first base station. Additionally, in response to the receiving the beam failure data, the machine-readable storage medium that can perform the operations comprising facilitating terminating the first physical downlink control channel transmission, associated with the first physical downlink control channel data, between the mobile device and the first base station device.

These and other embodiments or implementations are described in more detail below with reference to the drawings.

Referring now to FIG. 1, illustrated is an example wireless communication system 100 in accordance with various aspects and embodiments of the subject disclosure. In one or more embodiments, system 100 can comprise one or more user equipment UEs 102. The non-limiting term user equipment can refer to any type of device that can communicate with a network node in a cellular or mobile communication system. A UE can have one or more antenna panels having vertical and horizontal elements. Examples of a UE comprise a target device, device to device (D2D) UE, machine type UE or UE capable of machine to machine (M2M) communications, personal digital assistant (PDA), tablet, mobile terminals, smart phone, laptop mounted equipment (LME), universal serial bus (USB) dongles enabled for mobile communications, a computer having mobile capabilities, a mobile device such as cellular phone, a laptop having laptop embedded equipment (LEE, such as a mobile broadband adapter), a tablet computer having a mobile broadband adapter, a wearable device, a virtual reality (VR) device, a heads-up display (HUD) device, a smart car, a machine-type communication (MTC) device, and the like. User equipment UE 102 can also comprise IOT devices that communicate wirelessly.

In various embodiments, system 100 is or comprises a wireless communication network serviced by one or more wireless communication network providers. In example embodiments, a UE 102 can be communicatively coupled to the wireless communication network via a network node 104. The network node (e.g., network node device) can communicate with user equipment (UE), thus providing connectivity between the UE and the wider cellular network. The UE 102 can send transmission type recommendation data to the network node 104. The transmission type recommendation data can comprise a recommendation to transmit data via a closed loop MIMO mode and/or a rank-1 precoder mode.

A network node can have a cabinet and other protected enclosures, an antenna mast, and multiple antennas for performing various transmission operations (e.g., MIMO operations). Network nodes can serve several cells, also called sectors, depending on the configuration and type of antenna. In example embodiments, the UE 102 can send and/or receive communication data via a wireless link to the network node 104. The dashed arrow lines from the network node 104 to the UE 102 represent downlink (DL) communications and the solid arrow lines from the UE 102 to the network nodes 104 represents an uplink (UL) communication.

System 100 can further include one or more communication service provider networks that facilitate providing wireless communication services to various UEs, including UE 102, via the network node 104 and/or various additional network devices (not shown) included in the one or more communication service provider networks. The one or more communication service provider networks can include various types of disparate networks, including but not limited to: cellular networks, femto networks, picocell networks, microcell networks, interne protocol (IP) networks Wi-Fi service networks, broadband service network, enterprise networks, cloud based networks, and the like. For example, in at least one implementation, system 100 can be or include a large scale wireless communication network that spans various geographic areas. According to this implementation, the one or more communication service provider networks can be or include the wireless communication network and/or various additional devices and components of the wireless communication network (e.g., additional network devices and cell, additional UEs, network server devices, etc.). The network node 104 can be connected to the one or more communication service provider networks via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

Wireless communication system 100 can employ various cellular systems, technologies, and modulation modes to facilitate wireless radio communications between devices (e.g., the UE 102 and the network node 104). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc.

For example, system 100 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of proposed 5G networks may comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks may allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The upcoming 5G access network may utilize higher frequencies (e.g., >6 GHz) to aid in increasing capacity. Currently, much of the millimeter wave (mmWave) spectrum, the band of spectrum between 30 gigahertz (Ghz) and 300 Ghz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications, and has been widely recognized a potentially important component for access networks operating in higher frequencies. MIMO can be used for achieving diversity gain, spatial multiplexing gain and beamforming gain. For these reasons, MIMO systems are an important part of the 3rd and 4th generation wireless systems, and are planned for use in 5G systems.

Figure 2:
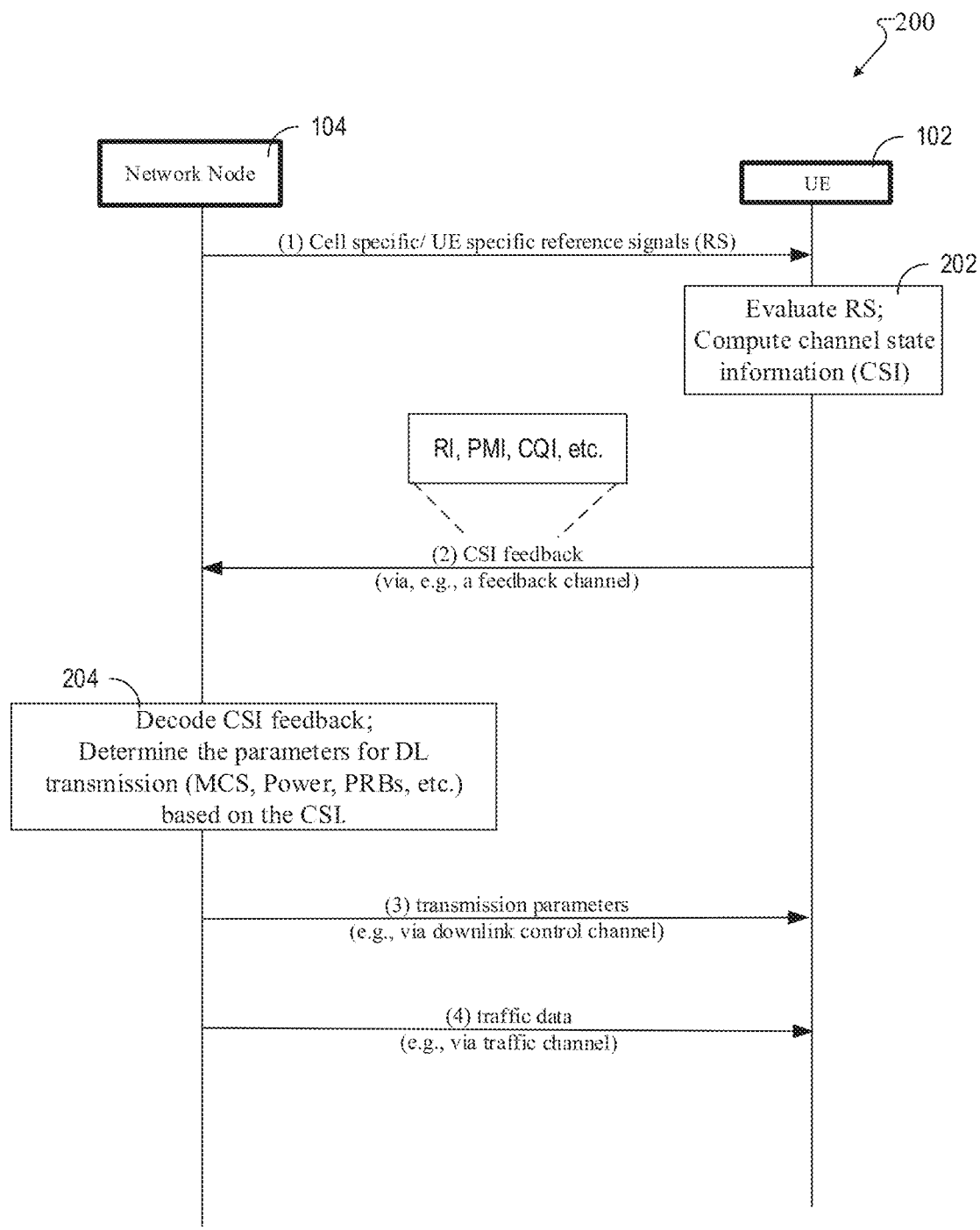
FIG. 2 illustrates an example schematic system block diagram of a UE in communication with a node device.

Referring now to FIG. 2, illustrated is an example schematic system block diagram of a UE in communication with a node device via a system 200. The system 200 comprises a network node (e.g., network node 104), can transmit a reference signal (RS) at transaction (1), which can be beam formed or non-beam formed, to a user equipment (e.g., UE 102). FIG. 2 illustrates a closed loop transaction diagram (e.g., sequence chart). Briefly described, in this technique, a reference signal is first sent from the network node to the UE. From the reference signals, the UE can compute the channel estimates and the parameters needed for channel state information (CSI) reporting. In LTE, the CSI report can comprise a channel quality indicator (CQI), precoding matrix index (PMI), rank information (RI), etc. The CSI report is sent to the network node via a feedback channel either on a periodic basis or on demand based CSI (e.g., aperiodic CSI reporting). The network node scheduler can use this information to choose the parameters for scheduling of this particular UE. The network node can send the scheduling parameters to the UE on the downlink control channel called the physical downlink control channel (PDCCH). After that, actual data transfer can take place from the network node to the UE on the physical downlink shared channel (PDSCH).

Downlink reference signals are predefined signals occupying specific resource elements within the downlink time—frequency grid. The reference signal can be cell specific or UE specific in relation to a profile of the user equipment 102 or some type of mobile identifier. There are several types of downlink reference signals that are transmitted in different ways and used for different purposes by the receiving terminal. Channel state information reference signals (CSI-RS) are specifically intended to be used by terminals to acquire channel state information (CSI) and beam specific information (beam RSRP). In 5G, CSI-RS is UE specific so it can have a significantly lower time/frequency density. Demodulation reference signals (DM-RS), sometimes referred to as UE-specific reference signals, are specifically intended to be used by terminals for channel estimation for the data channel. The label "UE-specific" relates to the fact that each demodulation reference signal is intended for channel estimation by a single terminal. That specific reference signal is then only transmitted within the resource blocks assigned for data traffic channel transmission to that terminal.

After receiving this reference signal, at block 202, the UE 102 can evaluate the reference signal and compute CSI, which can be transmitted to the network node as CSI feedback (e.g., a CSI report). The CSI feedback can comprise an indicator of channel state information (e.g., known in LTE as a precoding matrix indicator (PMI)), indicator of channel quality (e.g., known in LTE as a channel quality indicator (CQI)), and an indication of rank (e.g., known in LTE as rank indicator (RI)), each of which is discussed further below.

The indicator of channel state information (e.g., PMI in LTE) can be used for selection of transmission parameters for the different data streams transmitted between the network node and the UE. In techniques using codebook-based precoding, the network node and UE use different codebooks, which can be found in standards specifications, each of which relate to different types of MIMO matrices (for example, a codebook of precoding matrices for 2×2 MIMO). The codebook is known (contained) at the node and at the UE site, and can contain entries of precoding vectors and matrices, which are multiplied with the signal in the precoding stage of the network node. The decision as to which of these codebook entries to select is made at the network node based on CSI feedback provided by the UE, because the CSI is known at the receiver, but not at the transmitter. Based on the evaluation of the reference signal, the UE can transmit feedback that comprises recommendations for a suitable precoding matrix out of the appropriate codebook (e.g., points the index of the precoder in one of the codebook entries). This UE feedback identifying the precoding matrix is called the pre-coding matrix indicator (PMI). The UE is thus evaluating which pre-coding matrix would be more suitable for the transmissions between the network node and UE.

Additionally, the CSI feedback can comprise an indicator of channel quality (e.g., in LTE the channel quality indicator (CQI)), which indicates the channel quality of the channel between the network node and the user equipment for link adaptation on the network side. Depending on which value a UE reports, the node can transmit data with different transport block sizes. If the node receives a high CQI value from the UE, then it can transmit data with larger transport block size, and vice versa.

Also included in the CSI feedback can be the indicator of rank (rank indicator (RI) in LTE terminology), which provides an indication of the rank of the channel matrix, wherein the rank is the number of different transmission data streams (layers) transmitted in parallel, or concurrently (in other words, the number of spatial layers), between the network node and the UE, as discussed above. The RI determines the format of the rest of the CSI reporting messages. As an example, in the case of LTE, when RI is reported to be 1, the rank-1 codebook PMI will be transmitted with one CQI, and when RI is 2, a rank 2 codebook PMI and two CQIs will be transmitted. Since the RI determines the size of the PMI and CQI, it is separately encoded so the receiver can firstly decode the RI, and then use it to decode the rest of the CSI (which as mentioned, comprises the PMI and CQI, among other information). Typically, the rank indication feedback to the network node can be used to select of the transmission layer in downlink data transmission. For example, even though a system is configured in transmission mode 3 in the LTE specifications (or open loop spatial multiplexing) for a particular UE, and if the same UE reports the indicator of rank value as "1" to the network node, the network node may start sending the data in transmit diversity mode to the UE. If the UE reports a RI of "2," the network node might start sending the downlink data in MIMO mode (e.g., transmission mode 3 or transmission mode 4 as described in the LTE specifications). Typically, when a UE experiences bad signal to noise ratio (SNR) and it would be difficult to decode transmitted downlink data, it provides early warning to the network node in the form of feedback by stating the RI value as "1." When a UE experiences good SNR, then it passes this information to the network node indicating the rank value as "2."

After computing the CSI feedback, the UE 102 can transmit the CSI feedback at transaction (2), via a feedback channel, which can be a channel separate from the channel from which the reference signal was sent. The network node 104 can process the CSI feedback to determine transmission scheduling parameters (e.g., downlink (DL) transmission scheduling parameters), which comprise a modulation and coding parameter applicable to modulation and coding of signals by the network node device particular to the UE 102.

This processing of the CSI feedback by the network node 104, as shown in block 204 of FIG. 2, can comprise decoding the CSI feedback. The UE can decode the RI and then use the decoded information (for example, the obtained size of the CSI) to decode the remainder of the CR feedback (e.g., the CQI, PMI, etc.). The network node 104 can use the decoded CSI feedback to determine a suitable transmission protocol, which can comprise modulation and coding schemes (MCS) applicable to modulation and coding of the different transmissions between the network node 104 and the UE 102, power, physical resource blocks (PRBs), etc.

The network node 104 can transmit the parameters at transaction (3) to the UE 102 via a downlink control channel. Thereafter and/or simultaneously, at transaction (4), traffic data (e.g., non-control data such as data related to texts, emails, pictures, audio files videos, etc.) can be transferred, via a data traffic channel, from the network node 104 to the UE 102.

Figure 3:
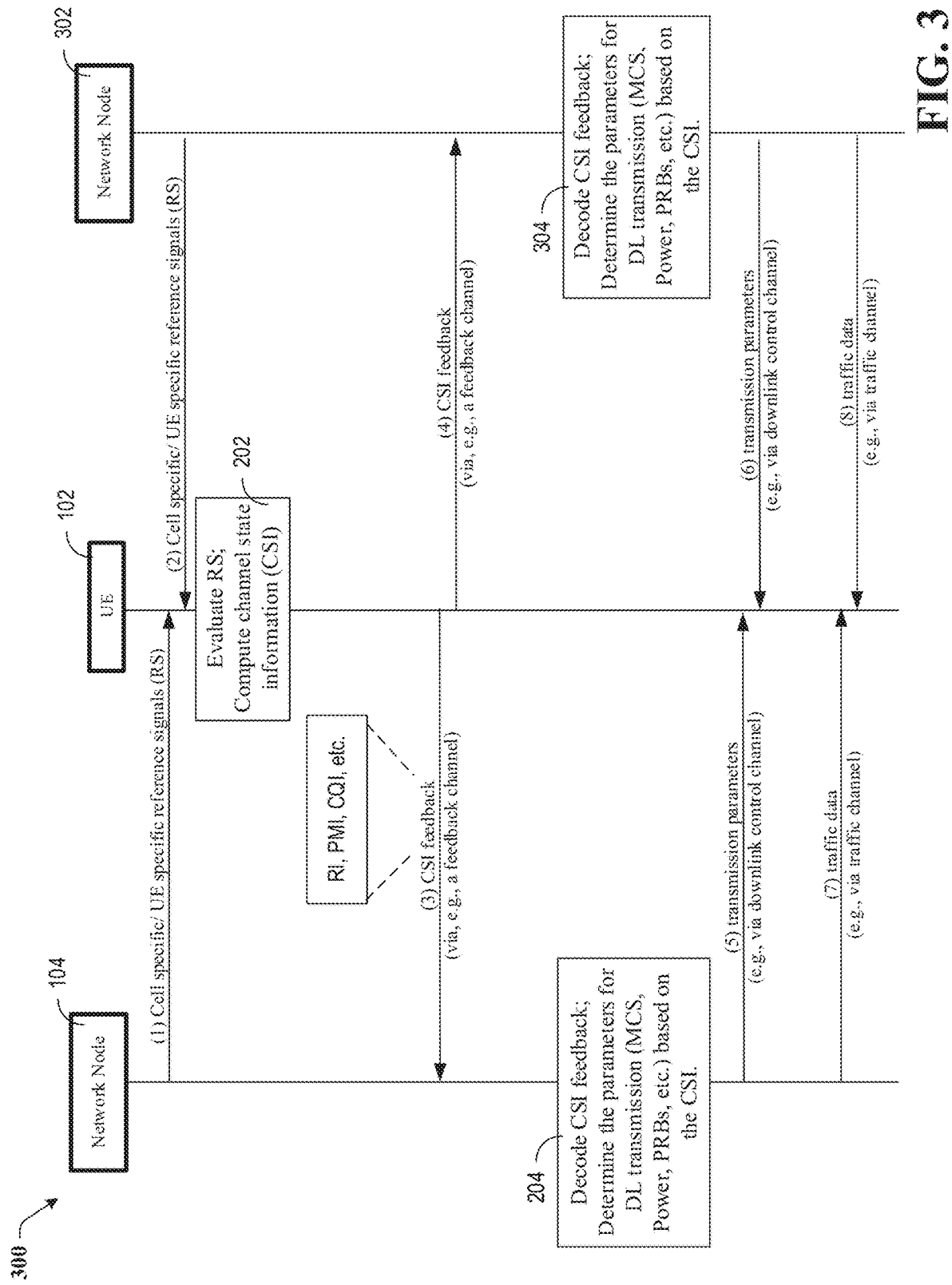
FIG. 3 illustrates an example schematic system block diagram of a non-coherent joint transmission with multi-downlink control data (DCI) in one or more embodiments.

Referring now to FIG. 3, illustrated is an example schematic system block diagram of a non-coherent joint transmission with multi-DCI in one or more embodiments. After the network node 104 receives CSI feedback from the UE 102, it can generate an independent DCI. The UE 102 can perform independent PDCCH detection on each network node 104, 302, followed by two separate PDSCHs. The PDSCHs can have full, partial, or no overlap in time and frequency allocation. ACK/NACK feedback for PDSCHs generated for each network node 104, 302 can be separate (e.g., sent for each network node 104, 302 independently) where the PUCCH resources carrying the ACK/NACK feedback can be time division multiplexed, or joint, where a joint HARQ-ACK codebook is generated for feedback for both TRP.

The system 300 comprises network nodes (e.g., network node 104, 302), and can transmit reference signal s(RS) from the network nodes 104, 302 at transaction (1) and transaction (2), respectively, which can be beam formed or non-beam formed, to the user equipment (e.g., UE 102). After computing the CSI feedback, the UE 102 can transmit the CSI feedback to the network nodes 104, 302 at transaction (3) and transaction (4), respectively, via feedback channels, which can be channels separate from the channels from which the reference signals were sent. The network nodes 104, 302 can process the CSI feedback to determine transmission scheduling parameters (e.g., downlink (DL) transmission scheduling parameters), which comprise modulation and coding parameters applicable to modulation and coding of signals by the network nodes 104, 302 particular to the UE 102.

This processing of the CSI feedback by the network nodes 104, 302, as shown in blocks 204, 304 of FIG. 3, can comprise decoding the CSI feedback. The UE 102 can decode the RI and then use the decoded information (for example, the obtained size of the CSI) to decode the remainder of the CSI feedback (e.g., the CQI, PMI, etc.). The network nodes 104, 302 can use the decoded CSI feedback to determine a suitable transmission protocol, which can comprise modulation and coding schemes (MCS) applicable to modulation and coding of the different transmissions between the network nodes 104, 302 and the UE 102, power, physical resource blocks (PRBs), etc.

The network nodes 104, 302 can transmit the parameters at transaction (5) and transaction (6) to the UE 102 via a downlink control channel. Thereafter and/or simultaneously, at transaction (7) and transaction 8, traffic data (e.g., non-control data such as data related to texts, emails, pictures, audio files videos, etc.) can be transferred, via a data traffic channel, from the network nodes 104, 302 to the UE 102.

Figure 4:
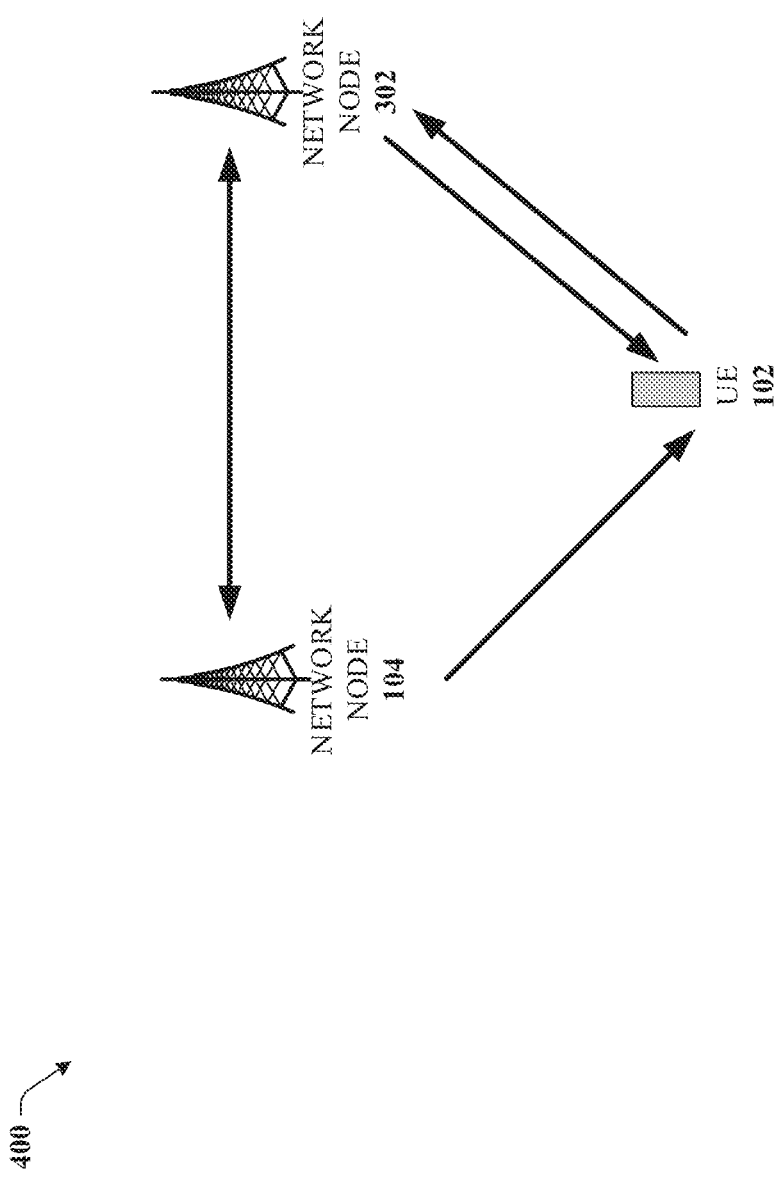
FIG. 4 illustrates an example schematic system block diagram of a non-coherent joint transmission utilizing multi-downlink control data according to one or more embodiments.

Referring now to FIG. 4, illustrated is an example schematic system block diagram of a non-coherent joint transmission utilizing multi-downlink control data. For the case of a multi-TRP transmission as represented by system 400, when a transmission on one of the network nodes 104, 302 fail, it is beneficial for the network to know immediately that the transmission failed on the network nodes 104, and then switch to a single network nodes 302 transmission. Thus, a partial beam failure recovery procedure can be used where failure on one network node 104 is indicated using the uplink control channel of the non-failed network node 302.

The UE 102 can be configured to receive PDCCH from the two different network nodes 104, 302. Thus, in a multiple PDCCH scenario, the UE 102 can receive two PDCCHs and two PDSCHs from the network nodes 104, 302, respectively. The UE 102 can be configured with a reference signal setting for each network nodes 104, 302, and the UE 102 can report on a selected transmission beam from each network nodes 104, 302, used for PDCCH and PDSCH transmission.

Consequently, the UE 102 can report the beam failure event on the failed network node 104 on the PUCCH carrying the ACK/NACK for the working network node 302, the PUSCH carrying uplink control information for the working network node 302, and/or a dedicated radio access channel (RACH) to the working network node 302. The beam management RSRP and beam failure event of the failing network node 104 can be jointly reported on a control feedback channel corresponding to the working network node 302. Thus, upon reception of the beam failure event, the working network node 302 can switch to a single transmission, until the connection with the failed network node 104 can be re-established.

Figure 5:
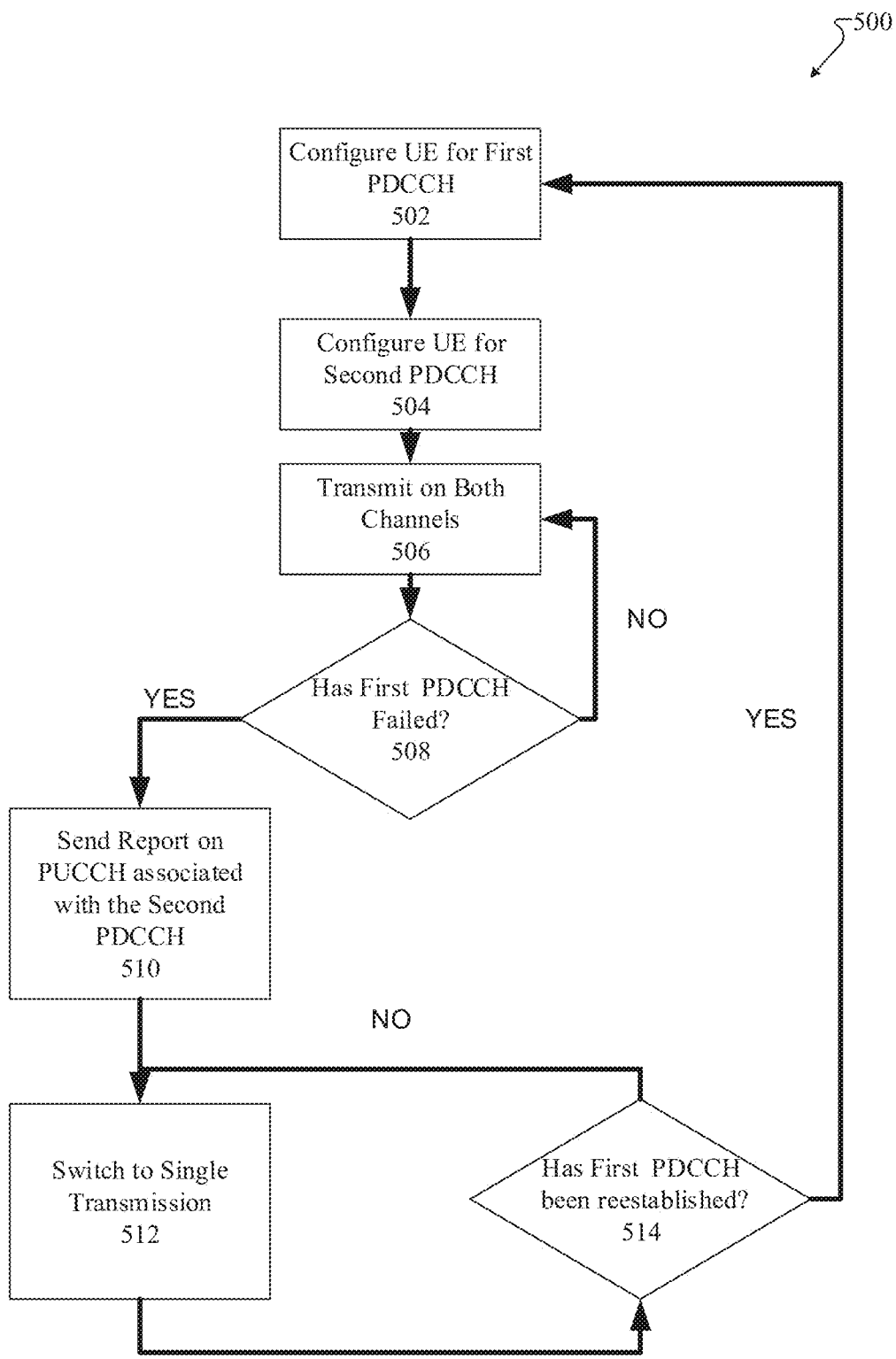
FIG. 5 illustrates an example schematic system block diagram of a beam failure procedure according to one or more embodiments.

Referring now to FIG. 5 illustrates an example schematic system block diagram of a beam failure procedure 500. At block 502 a UE 102 can be configured to receive data with a first network node 104 via a PDCCH, and at block 504, the UE 102 can be configured to receive data via a second network node 302 via another PDCCH. Because the UE 102 is configured to receive data on both PDCCHs, the UE can also be configured to transmit data on two difference PUCCHs at block 506. However, if the first PDCCH fails at block 508, the UE can send a report on the PUCCH associated with the second network node 302, which is also associated with the second PDCCH at block 510. It should be noted that the process is reversed with regards to the network node 302 if a channel associated with the network node 302 fails. Once the report is sent to the second network node 302, the system can switch to a single transmission at block 512 via the second network node 302 instead of utilizing the network node 104 and the network node 302 for dual communication. At block 514, it if the first PDCCH communication has been reestablished, then the system can proceed back to block 502 and configure the UE 102 for communication with the first network node 104 again (e.g., dual transmissions). However, if the first PDCCH communication has not been reestablished, then the system can remain in single transmission mode as reference at block 512.

Figure 6:
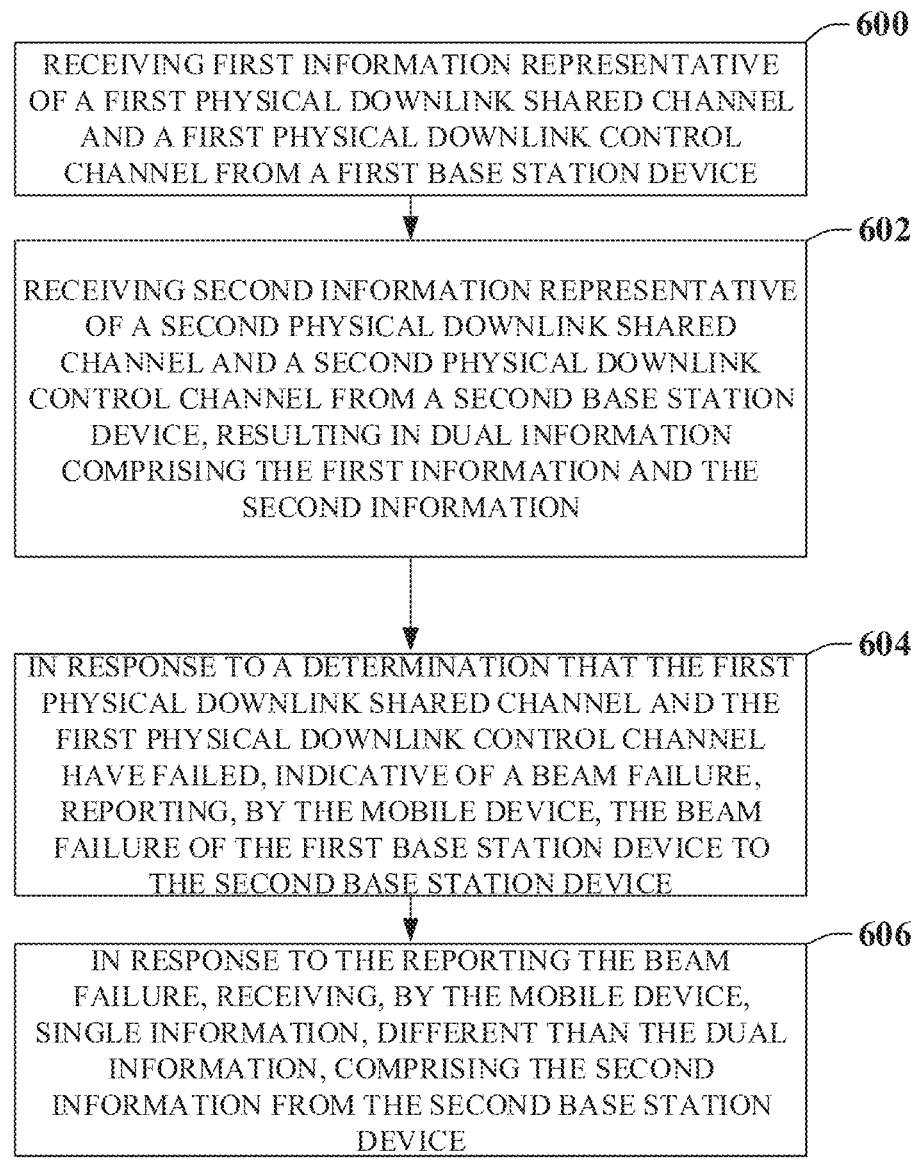
FIG. 6 illustrates an example flow diagram for a method for beam failure control for a 5G network according to one or more embodiments.

Referring now to FIG. 6, illustrated is an example flow diagram for a method for beam failure control for a 5G network according to one or more embodiments.

At element 600, the method can comprise receiving, by a mobile device (e.g., UE 102) comprising a processor, first information representative of a first physical downlink shared channel and a first physical downlink control channel from a first base station device (e.g., network node 104). The method can comprise receiving, by the mobile device (e.g., UE 102), second information representative of a second physical downlink shared channel and a second physical downlink control channel from a second base station device (e.g., network node 302) at element 602, resulting in dual information comprising the first information and the second information. In response to a determination that the first physical downlink shared channel and the first physical downlink control channel have failed, indicative of a beam failure, the method can comprise reporting, by the mobile device (e.g., UE 102), the beam failure of the first base station device (e.g., network node 104) to the second base station device (e.g., network node 302) at element 604. Additionally, in response to the reporting the beam failure, the method can comprise receiving, by the mobile device (e.g., UE 102), single information, different than the dual information, comprising the second information from the second base station device (e.g., network node 302) at element 606.

Figure 7:
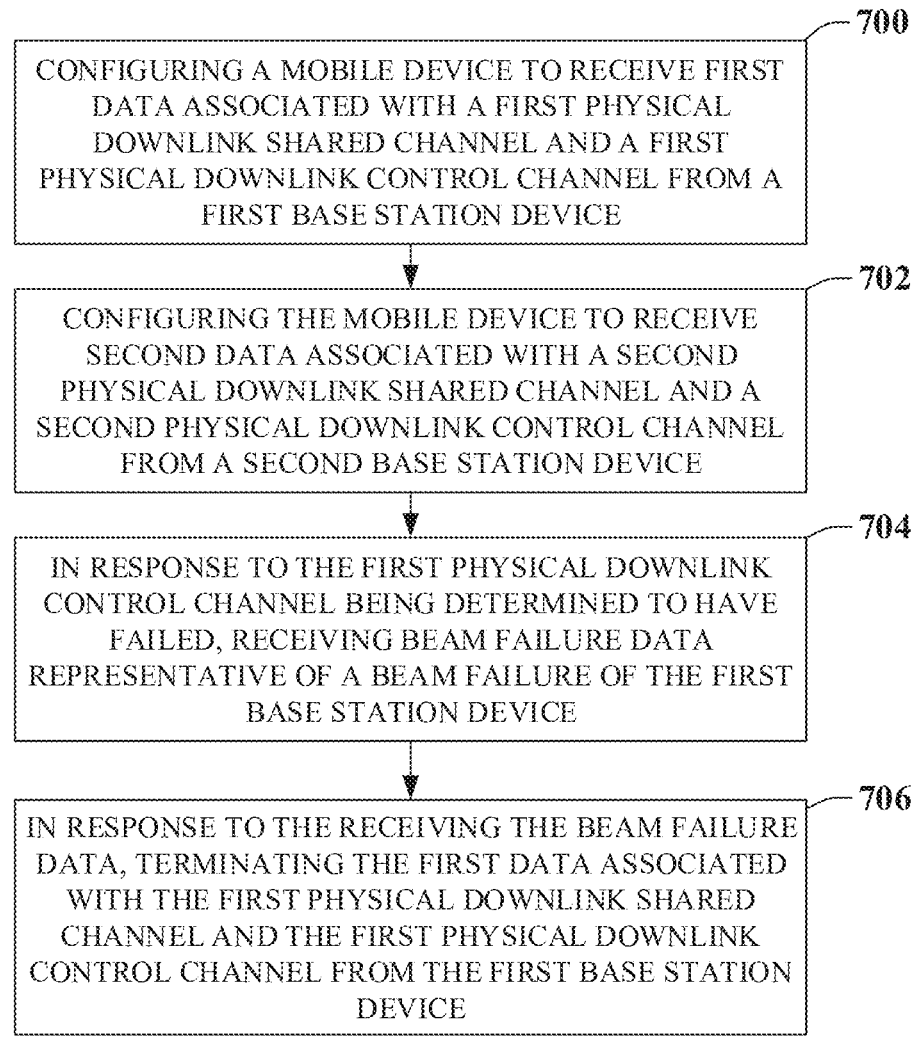
FIG. 7 illustrates an example flow diagram for a system for beam failure control for a 5G network according to one or more embodiments.

Referring now to FIG. 7, illustrated is an example flow diagram for a system for beam failure control for a 5G network according to one or more embodiments.

At element 700, a system can facilitate, configuring a mobile device (e.g., UE 102) to receive first data associated with a first physical downlink shared channel and a first physical downlink control channel from a first base station device (e.g., network node 104). At element 702, the system can comprise configuring the mobile device to receive second data associated with a second physical downlink shared channel and a second physical downlink control channel from a second base station device (e.g., network node 302). In response to the first physical downlink control channel being determined to have failed, at element 704, the system can comprise receiving beam failure data representative of a beam failure of the first base station device (e.g., network node 104). Additionally, at element 706 in response to the receiving the beam failure data, the system can comprise terminating the first data associated with the first physical downlink shared channel and the first physical downlink control channel from the first base station device (e.g., network node 104).

Figure 8:
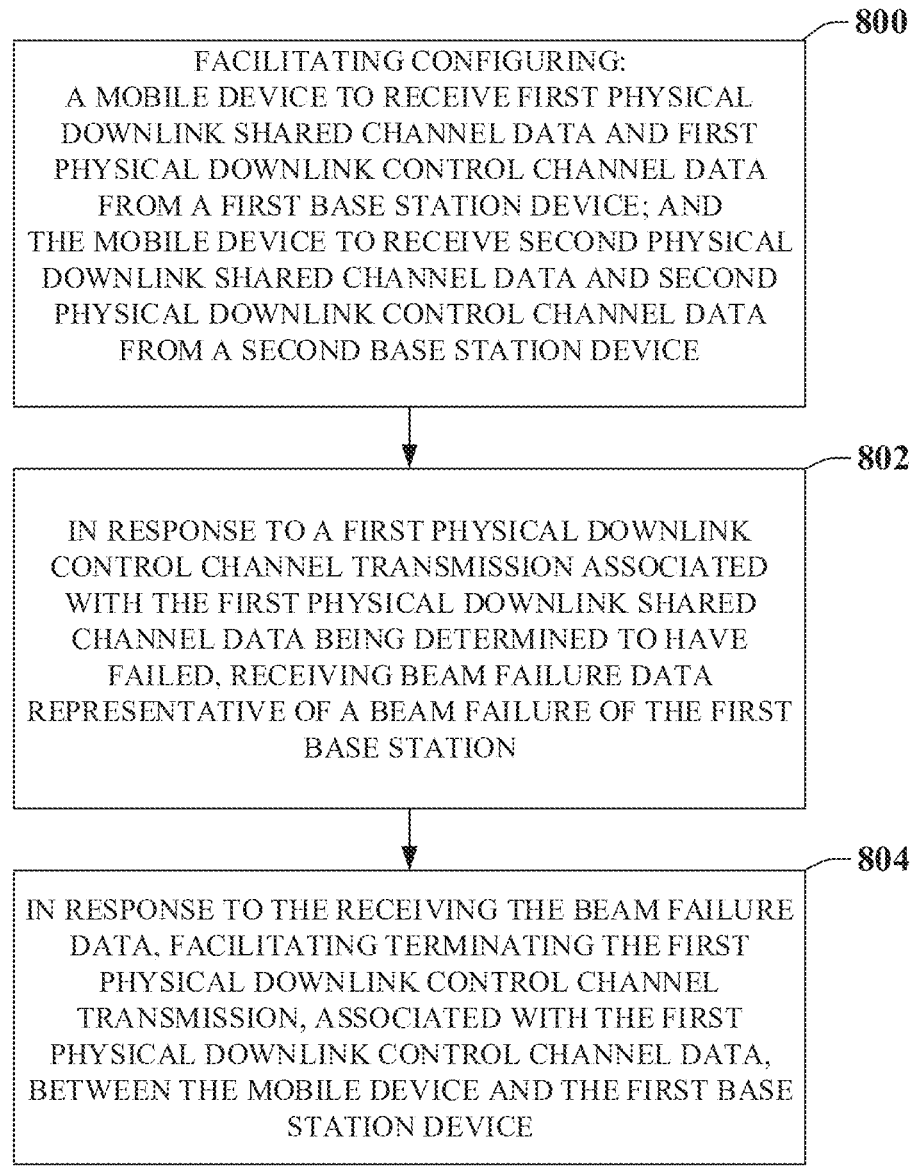
FIG. 8 illustrates an example flow diagram for a machine-readable medium for beam failure control for a 5G network according to one or more embodiments.

Referring now to FIG. 8, illustrated is an example flow diagram for a machine-readable medium for beam failure control for a 5G network according to one or more embodiments.

At element 800, the machine-readable storage medium that can perform the operations comprising facilitating configuring a mobile device (e.g., UE 102) to receive first physical downlink shared channel data and first physical downlink control channel data from a first base station device (e.g., network node 104), and configuring the mobile device to receive second physical downlink shared channel data and second physical downlink control channel data from a second base station device (e.g., network node 302). In response to a first physical downlink control channel transmission associated with the first physical downlink shared channel data being determined to have failed, the machine-readable storage medium can perform the operations comprising receiving beam failure data representative of a beam failure of the first base station (e.g., network node 104) at element 802. Additionally, in response to the receiving the beam failure data, the machine-readable storage medium that can perform the operations comprising facilitating terminating the first physical downlink control channel transmission, associated with the first physical downlink control channel data, between the mobile device (e.g., UE 102) and the first base station device (e.g., network node 104) at element 804.

Figure 9:
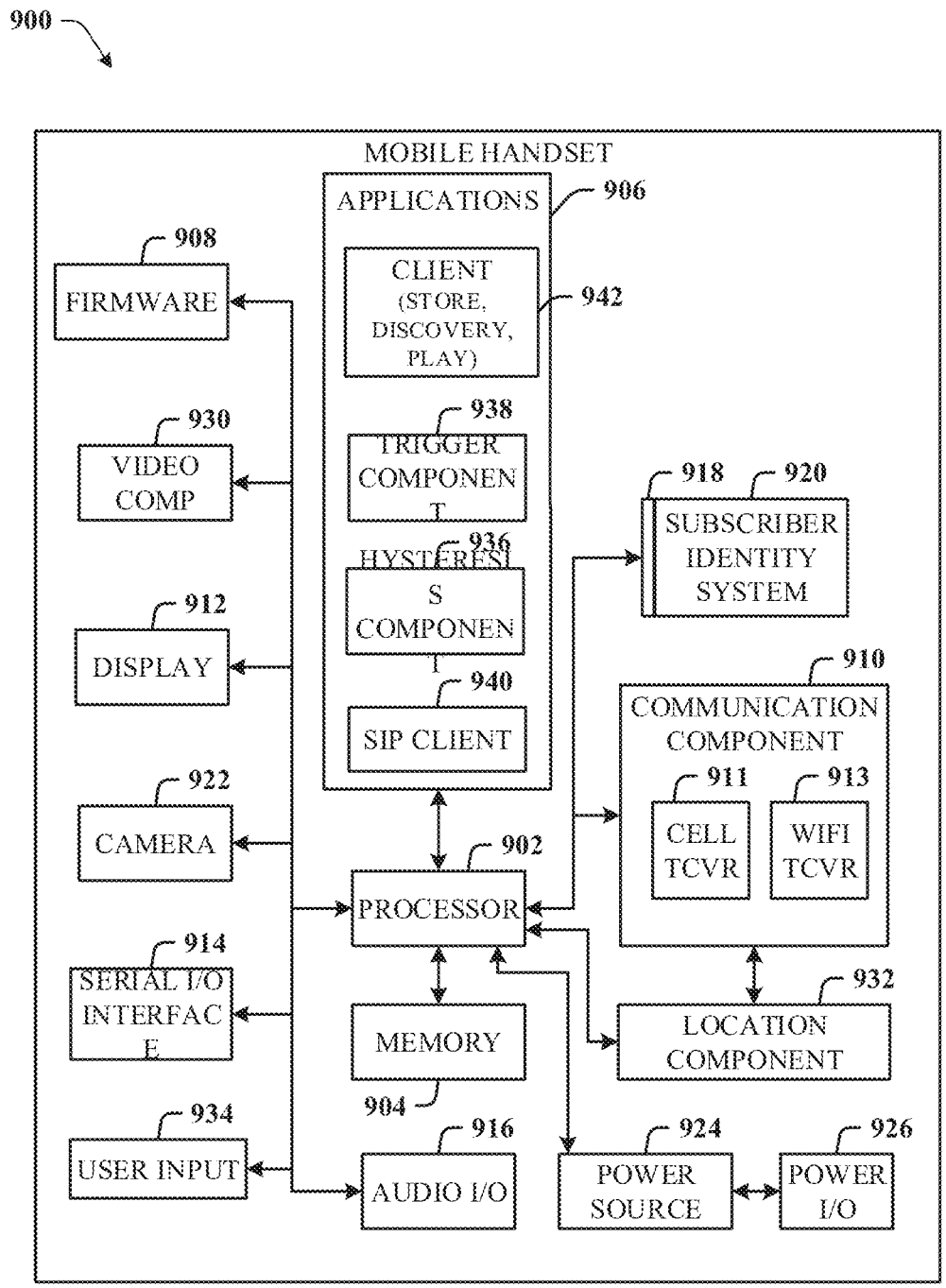
FIG. 9 illustrates an example block diagram of an example mobile handset operable to engage in a system architecture that facilitates secure wireless communication according to one or more embodiments described herein.

Referring now to FIG. 9, illustrated is a schematic block diagram of an exemplary end-user device such as a mobile device 900 capable of connecting to a network in accordance with some embodiments described herein. Although a mobile handset 900 is illustrated herein, it will be understood that other devices can be a mobile device, and that the mobile handset 900 is merely illustrated to provide context for the embodiments of the various embodiments described herein. The following discussion is intended to provide a brief, general description of an example of a suitable environment 900 in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 900 includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1394) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communication component 910 to accommodate IP traffic from an IP network such as, for example, the Internet, a corporate intranet, a home network, a person area network, etc., through an ISP or broadband cable provider. Thus, VoIP traffic can be utilized by the handset 900 and ISP-based multimedia content can be received in either an encoded or decoded format.

A video processing component 922 (e.g., a camera) can be provided for decoding encoded multimedia content. The video processing component 922 can aid in facilitating the generation, editing and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 938 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

Figure 10:
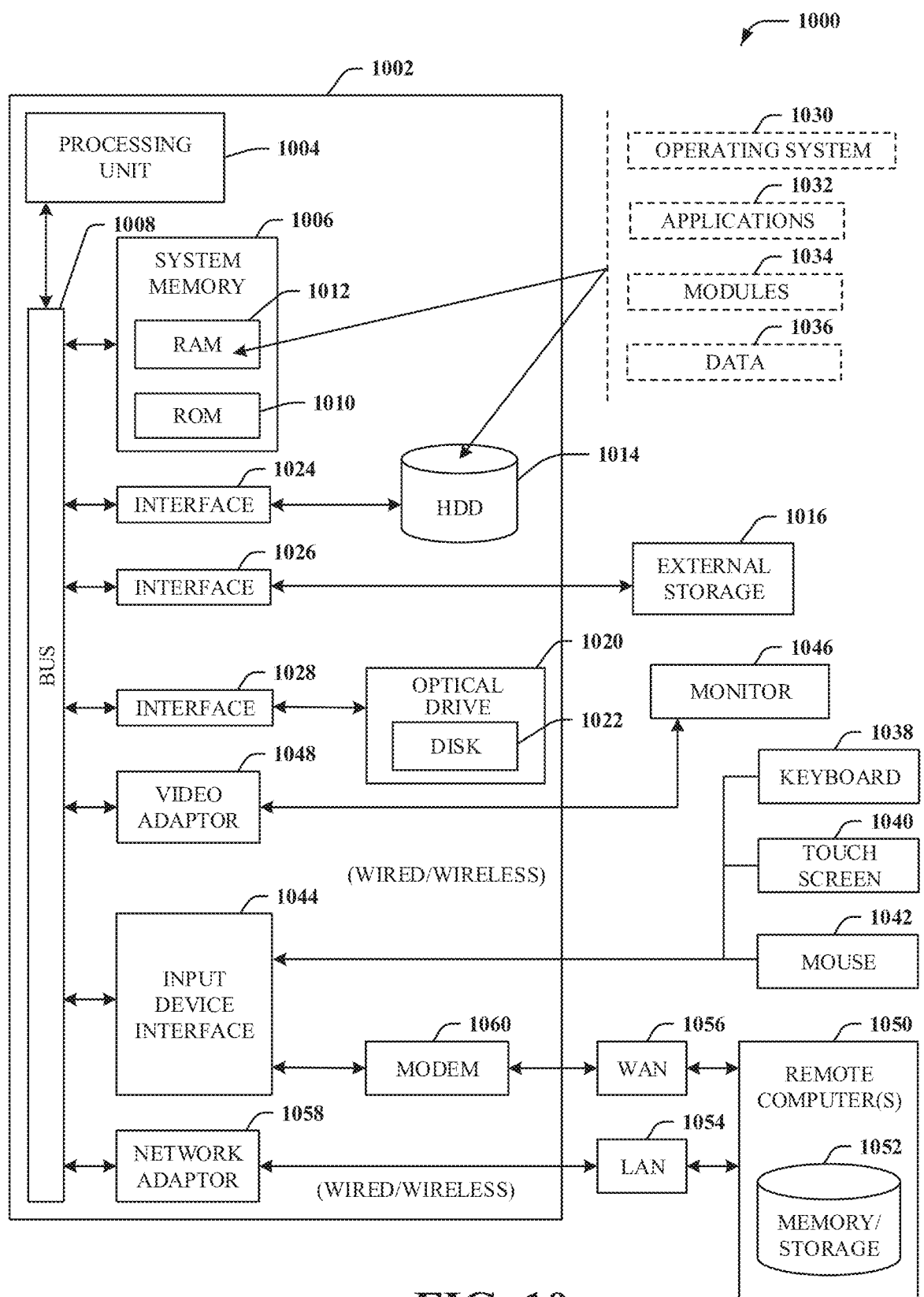
FIG. 10 illustrates an example block diagram of an example computer operable to engage in a system architecture that facilitates secure wireless communication according to one or more embodiments described herein.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the disclosed methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGS. where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   receiving, by a mobile device comprising a processor, first information representative of a first physical downlink shared channel and a first physical downlink control channel from a first base station device;
   receiving, by the mobile device, second information representative of a second physical downlink shared channel and a second physical downlink control channel from a second base station device, resulting in dual information comprising the first information and the second information;
   in response to a determination that the first physical downlink shared channel and the first physical downlink control channel have failed, indicative of a beam failure, reporting, by the mobile device, the beam failure of the first base station device to the second base station device;
   in response to the reporting the beam failure, receiving, by the mobile device, single information, different than the dual information, comprising the second information from the second base station device; and
   in response to the beam failure being determined to have ceased, reimplementing a dual information transmission associated with the first base station device and the second base station device.

2. The method of claim 1, further comprising:
   in response to the receiving the first physical downlink shared channel and the first physical downlink control channel, configuring, by the mobile device, a resource setting for a resource associated with the first base station device.

3. The method of claim 2, wherein the resource is a synchronization signal associated with the first base station device.

4. The method of claim 2, wherein the resource is a physical broadcast channel associated with the first base station device.

5. The method of claim 1, wherein the reporting comprises reporting on a transmit beam selected by the second base station device.

6. The method of claim 1, wherein the determination that the first physical downlink shared channel and the first physical downlink control channel have failed is based on a block error rate first physical downlink control channel.

7. The method of claim 1, wherein the beam failure is further to be reported via a physical uplink control channel of the second base station device.

8. A system, comprising:
   a processor; and
   a memory that stores executable instructions that, when executed by the processor, facilitate performance of operations, comprising:
   configuring a mobile device to receive first data associated with a first physical downlink shared channel and a first physical downlink control channel from a first base station device;
   configuring the mobile device to receive second data associated with a second physical downlink shared channel and a second physical downlink control channel from a second base station device;
   in response to the first physical downlink control channel being determined to have failed, receiving beam failure data representative of a beam failure of the first base station device;
   in response to the receiving the beam failure data, terminating the first data associated with the first physical downlink shared channel and the first physical downlink control channel from the first base station device; and
   in response to the beam failure being determined to have ceased, reimplementing a dual data transmission associated with the first base station device and the second base station device.

9. The system of claim 8, wherein the operations further comprise:
   selecting a transmit beam of the second base station device to be utilized to receive the beam failure data.

10. The system of claim 8, wherein the operations further comprise:
    configuring the mobile device with a transmission configuration indication state.

11. The system of claim 10, wherein the transmission configuration indication state is utilized to decode the first physical downlink shared channel and the second physical downlink shared channel.

12. The system of claim 8, wherein the beam failure data is received via a physical uplink shared channel of the second base station device.

13. The system of claim 8, wherein the beam failure data is received via a radio access channel of the second base station device.

14. A non-transitory machine-readable medium, comprising executable instructions that, when executed by a processor, facilitate performance of operations, comprising:
    facilitating configuring:
    a mobile device to receive first physical downlink shared channel data and first physical downlink control channel data from a first base station device; and
    the mobile device to receive second physical downlink shared channel data and second physical downlink control channel data from a second base station device;

in response to a first physical downlink control channel transmission associated with the first physical downlink shared channel data being determined to have failed, receiving beam failure data representative of a beam failure of the first base station device;

in response to the receiving the beam failure data, facilitating terminating the first physical downlink control channel transmission, associated with the first physical downlink control channel data, between the mobile device and the first base station device; and in response to the beam failure being determined to have ceased, reimplementing a dual data transmission associated with the first base station device and the second base station device.

15. The non-transitory machine-readable medium of claim 14, wherein the beam failure data is received via a physical uplink control channel associated with the second base station device.

16. The non-transitory machine-readable medium of claim 15, wherein the physical uplink control channel transmits acknowledgment data representative of an acknowledgment for the second base station device.

17. The non-transitory machine-readable medium of claim 16, wherein the acknowledgment data comprises a bit indicative of the beam failure having been determined to have occurred.

18. The non-transitory machine-readable medium of claim 16, wherein the acknowledgment data comprises channel state data indicative of the beam failure having been determined to have occurred.

19. The non-transitory machine-readable medium of claim 14, wherein the beam failure data is received via a control feedback channel associated with the second base station device.

20. The system of claim 8, wherein the operations further comprise:

in response to the receiving the first physical downlink shared channel and the first physical downlink control channel, configuring, by the mobile device, a resource setting for a resource associated with the first base station device.

* * * * *